United States Patent [19]

Falcón

[11] Patent Number: 5,633,657
[45] Date of Patent: May 27, 1997

[54] MOUSE DRIVER ARRANGEMENT FOR PROVIDING ADVANCED SCROLLING CAPABILITIES TO A CONVENTIONAL MOUSE

[76] Inventor: Fernando D. Falcón, Fray Justo Santa Maria de Oro 2511 10 B (1425), Buenos Aires, Argentina

[21] Appl. No.: 320,987

[22] Filed: Oct. 11, 1994

[51] Int. Cl.$^6$ .................... G09G 5/08; G09G 5/34
[52] U.S. Cl. .................... 345/145; 345/123; 345/163
[58] Field of Search ................ 345/121, 123–125, 345/145, 163–167; 364/236.8, 927.62, 929.12

[56] References Cited

U.S. PATENT DOCUMENTS

| | | | |
|---|---|---|---|
| 4,720,703 | 1/1988 | Schnarel, Jr. et al. | 345/163 |
| 5,075,673 | 12/1991 | Yanker | 345/163 |
| 5,313,229 | 5/1994 | Gilligan et al. | 345/157 |
| 5,374,942 | 12/1994 | Gilligan et al. | 345/163 |

*Primary Examiner*—Jeffery Brier
*Attorney, Agent, or Firm*—Christensen O'Connor Johnson & Kindness PLLC

[57] ABSTRACT

A mouse driver arrangement combining a first functional block, comprising a scrolling-rate function generator for generating a time-dependent scrolling-rate control signal of pre-defined shape, whose output cycle is a function of the activation status of one or more mouse push-buttons, plus a second functional block, comprising a cursor trail analyzer for detecting a dominant direction in a cursor trail and setting a scrolling direction option accordingly. The scrolling-rate function generator includes an integrator for producing ramp-like scrolling-rate control signal segments of adjustable slopes under control of the mouse push-buttons. The output of both first and second functional blocks are combined in a scrolling-vector status variable, whose magnitude is controlled by the scrolling-rate function generator and represents the scrolling rate, and whose direction is set by the cursor trail analyzer and represents the scrolling heading.

19 Claims, 8 Drawing Sheets

MOUSE DRIVER ARRANGEMENT FOR PROVIDING ADVANCED SCROLLING CAPABILITIES TO A CONVENTIONAL MOUSE

FIELD OF THE INVENTION

The present invention relates to computer input devices in which a transducer converts translational motion of a housing into a position signal for controlling movement of a cursor associated with a visual display system. More specifically, the present invention relates to a new use of concepts known in the field of electronic music synthesizers, applied to scrolling control in a mouse driver.

BACKGROUND OF THE INVENTION

A mouse capable of providing concurrent control of cursor position and scrolling is disclosed in U.S. Pat. No. 5,313,229 issued on May 17, 1994 to Gilligan and Falcon (incorporated herein by reference), which is based on the addition of a supplementary control means to a conventional mouse device for generating a scrolling-control signal, which is combined with an operational method to set the scrolling direction by analyzing the dominant axis present in a cursor trail (hereinafter "dominant axis method"). The dominant axis method provides the capability of setting the scrolling axis from an arbitrary cursor position, while the supplementary control means provides variable-rate scrolling within the selected axis. The scrolling capabilities of the mouse disclosed in the referenced patent provide a number of operating and ergonomic advantages, but requires a special hardware design to fit the supplementary control means and associated electronic circuitry into the mouse housing.

The dominant axis concept can clearly also be used to add some scrolling capabilities to a conventional mouse. This can be done through an alternative embodiment of the invention disclosed in the referenced patent, in which the binary control signal generated by one of the mouse's push-buttons is assigned for enabling/disabling a fixed-rate periodic signal for generating incremental scrolling commands, and the dominant axis method is used for controlling the scrolling direction. This can bring some of the benefits of the mouse disclosed in the referenced patent to a simple, push-button-like conventional mouse device.

However, a fixed-rate scrolling has a number of disadvantages, compared to a variable-rate approach. The first disadvantage of fixed-rate scrolling is that there is always a rate/precision tradeoff in setting the fixed scrolling-rate. This is because if the scrolling-rate is too low, the final scrolling position can be set accurately but scrolling operations consume excessive time. On the other hand, a high-rate scrolling can be fast, but lacks precision in the final scrolling position, because abrupt scrolling-rate changes overwhelm the response time of a normal operator, making an accurate control impossible. In other words, the closed-loop control system configured by the operator, the mouse, and the computer system, is saturated when abrupt scrolling-rate changes occur, what results in a non-linear response. This phenomenon impedes the ability of the operator to reach the desired scrolling position in a single operation, what leads to repeated mouse push-button activations while scrolling the image in a back and forth fashion, until the desired scrolling position is finally achieved. At the same time, this disturbs the operator's attention and so reduces his or her productivity. For all these reasons, a fixed-rate scrolling capability is usable only if it is limited to a very low scrolling rate.

All the mentioned disadvantages make variable-rate scrolling a necessary feature in a mouse with scrolling capabilities. On the other hand, scrolling operations are essentially dynamic operations, since they deal with data-items moving in a displayed image. It has been observed that because of the particular contour conditions in which scrolling operations are performed (imposed by operators' needs as well as by the computer system's limitations), when a mouse as the one disclosed in the referenced patent is operated, the scrolling-rate control signal has a characteristic profile or variation-pattern that comes up each time a scrolling operation is performed.

One of these characteristics is that since an operator normally works on a still image, the signal's value is always zero at the beginning and at the end of a scrolling operation. In other words, the scrolling rate control signal does not need to be set to a given value and kept at that value for long periods of time. Another characteristic of variable-rate scrolling operations is that the scrolling-rate control signal usually rises from zero to a maximum value at the beginning of the scrolling operation, and at an approximately constant variation rate. This happens mainly because operators normally avoid abrupt scrolling-rate changes, for the reasons stated above. Another characteristic of scrolling operations is that once the maximum scrolling rate is achieved, an operator normally maintains that scrolling rate until he or she perceives that the target scrolling position is about to come up on the computer's display. At that point, an operator normally slows down the scrolling rate to get a clearer picture of the scrolling image, until the target data item appears on the display, and hence reduces the scrolling-rate to zero (i.e., back to a still image).

Therefore, a scrolling operation can be seen as a dynamic cycle comprising at least an attack segment of rising scrolling-rate, a sustain segment of more or less constant scrolling-rate, and a decay segment of decreasing scrolling-rate. This leads to an analogy between the control requirements of a scrolling operation and the generation of a musical note's envelope by an electronic music synthesizer.

For example, a musical note's volume is zero by default, and is heard only when a musician plays a note in the synthesizer's keyboard. Once a note is started, the note's volume rises at a pre-set variation rate until it gets to its normal volume level. At that point, the note's volume stays at the same level until the musician releases the note's key, after what the note's volume falls at another pre-set variation rate, until it gets back to zero.

In an electronic music synthesizer, the various signal segments corresponding to a note's envelope function are produced by an envelope generator, which is an electronic device for generating an output function of pre-defined shape, triggered by a key's binary control signal. This is possible since all notes of a certain instrument have very similar envelope profiles, with slight differences between one particular note and the next. If this was not true, a musician would need to manually control each note's envelope through for example pressure sensitive keys or the like. At the same time, the cost of such a keyboard would be much higher than a simple binary-switch keyboard.

Consequently, although scrolling operations and electronic generation of musical notes belong to completely different fields, both can be seen as similar control problems, and therefore the control techniques used in the second field can be used in the first one, with many advantages.

Therefore, there is a need for a mouse driver that, taking advantage of the dynamic characteristics of scrolling operations, is capable of providing many of the benefits of the mouse disclosed in the referenced patent to a low-cost conventional push-button mouse, to carry those benefits to the huge installed base of conventional mice at a minimum cost.

SUMMARY OF THE INVENTION

It is a general object of the present invention to provide a mouse driver arrangement capable of performing scrolling at a plurality of speeds and directions using a simple push-button mouse device.

It is another object of the present invention to provide a wide-range variable-rate scrolling capability to a conventional mouse at no hardware cost.

It is another object of the present invention to provide a mouse driver arrangement to improve the operation of a conventional mouse by reducing the average mouse button strokes to get to a given scrolling position.

It is a fundamental object of the present invention to provide a mouse driver arrangement to shorten the average time consumed by scrolling operations, to improve efficiency and enhance user comfort.

It is still another fundamental object of the present invention to provide a mouse driver arrangement that can be transparently implemented in contemporary mouse applications and that is compatible with conventional mouse usage methods.

It is still another object of the present invention to provide a mouse driver arrangement having the functionality and versatility set forth above while requiring minimum training to take advantage of its operational features.

According to the invention, the mouse driver capable of providing scrolling capabilities to a conventional push-button mouse device is based on a combination of a first functional block, comprising a scrolling rate function generator means (hereinafter "SRFG") for generating a time-dependent scrolling-rate control signal of pre-defined shape, whose output cycle is a function of the activation status of one or more mouse push-buttons, plus a second functional block, comprising a cursor trail analyzer (hereinafter "CTA"), which is a circuit means for detecting a dominant direction in a cursor trail, and which is an improvement of the dominant axis method disclosed in the referenced patent.

The output of both first and second functional blocks are combined in a scrolling-vector status variable, whose magnitude is controlled by the SRFG and represents the scrolling rate, and whose direction is set by the CTA through mouse movements and represents the scrolling heading.

The scrolling-vector components are transformed by the rest of the mouse driver code into a train of incremental scrolling commands of variable width, according to the projection of the scrolling-vector over the x and y axis of the display means, being the rate of generation of the incremental scrolling commands related to the scrolling-vector magnitude.

The CTA functional block of the mouse driver arrangement of the present invention is derived from the one disclosed in the referenced patent (block 91, FIG. 6 of the referenced patent). The CTA sets the scrolling vector direction by analyzing the cursor movement and detecting a dominant direction amid a plurality of scrolling direction alternatives.

The SRFG functional block comprises an integrator means whose input is switched to one of two alternative input signals, according to the activation status of one of the mouse push-buttons, which is assigned for scrolling control (hereinafter "scroll button"). The SRFG produces an output signal waveform comprising several ramp-like segments of different adjustable slopes, including an attack segment, a sustain segment and a decay segment (equivalent to the analogous segments available in envelope generators of music synthesizers), controlled by activation of the scroll button. A second mouse push-button is assigned for discharging the integrator abruptly (hereinafter "stop button"). The stop button is used when the operator identifies a certain data item in the scrolling image, and decides to stop at the current scrolling position, without waiting for the SRFG cycle to end.

In this way, the SRFG feature of the mouse driver of the present invention expands the two-level control signal generated by a mouse push-button's switch into a multi-level scrolling-rate control signal, by generating a time-dependent signal of a pre-defined shape, related to the time-domain evolution of the two-level input signal generated by the push-button.

A fundamental advantage of the present invention is that the smooth output-signal variation provided by the integrator means of the SRFG allows a much higher final scrolling rate, since it facilitates visual interpretation of a scrolling image by the operator while the scrolling rate is being increased or decreased.

Another advantage of the present invention is that the use of a function generator for scrolling-rate control makes scrolling operations controllable, even at high scrolling rates, since all scrolling operations are governed by the function generator's signal, in a pre-definable manner. Therefore, although a simple binary control signal is used, the computer system's scrolling-response is predictable, once the transfer function of the SRFG is learned by the operator, allowing a much more effective scrolling control.

Moreover, if the transfer function of the SRFG is kept linear (i.e., the scrolling rate is made exactly equal to the time-integral of the step input signal multiplied by a constant), the SRFG-driven scrolling response is even more predictable, since the relationship that bonds the scrolling rate to the input signal is the same relationship that bonds velocity and force in classic physics. In other words, Newton's law states that given a physical body in an inertial reference axis system, the body's velocity is the time-integral of the net force acting on the body, divided by the body's mass, as expressed in the following equation:

$$v = 1/m \int f \, dt \qquad (1)$$

where "v" is the body's velocity, "m" is the body's mass and f is the net force acting on the body. If the scrolling rate is made proportional to the SRFG's output, the equation relating scrolling rate to the signal generated by the scroll button is:

$$SR = 1/k \int S \, dt \qquad (2)$$

where "SR" is the scrolling vector magnitude (i.e., scrolling rate), "K" is a constant that can have two different values related respectively to the attack and decay segments' slopes, and "S" is a Boolean variable that can take the values 0 or 1, representing the activation status of the scroll button.

In this way, the SRFG response predictability is enhanced, since the display's image acts as if it was a physical object with a given mass and a given friction. For example, if a long attack segment and a long decay segment are set for the SRFG, the scrolling response can be associated to a casino's roulette or a free-rotating bicycle wheel, while if a short attack segment and a short decay segment are set for the SRFG, the scrolling response can be associated to a fan with poor lubrication. The intuitive knowledge that almost every human being has about how these physical systems react makes the SRFG-driven scrolling response predictable, and can be easily mastered to achieve a fast and effective scrolling control.

Moreover, in the CTA's implementation of the present mouse driver arrangement, sloped scrolling directions are achieved by projecting the scrolling vector on the x and y axis of the display means and generating incremental scrolling commands accordingly. Therefore, equations 1 and 2 can also be considered in vectorial form, and the resultant scrolling rate is the sum of the components in both directions. The same is true for other dynamic variables involved in the process (e.g., impulse, acceleration, distance, etc.). In other words, the CTA feature is used for dynamically setting the scrolling-vector direction, while the scroll button is used for giving impulse to the displayed image in that direction, by enabling a "scrolling force" during the time period in which the scroll button is activated.

It is still another advantage of the present invention that since the control action (i.e., the scroll button's pressing or releasing) needs to be made only in the transitions from an increasing scrolling-rate to a decreasing scrolling-rate or vice versa, no action is needed in between, and so the average mouse push-button strokes necessary to get to a given scrolling position are reduced. The overall effect is as if the displayed image could be "charged" with a scrolling impulse at a controlled pace, and later "discharged" at a different pace as needed, avoiding many of the intermediate push-button activations.

It is still another advantage of the present invention that during the decay segment of the SRFG cycle, scrolling is performed with no mouse action, since it is governed by the SRFG, and so at that point the mouse is already free for another operation. In other words, since the displayed image can be "charged" with impulse in the attack segment, during the decay segment when the image consumes its own kinetic energy, the operator can start another mouse task concurrently, what makes the mouse's operation even more efficient and dynamic.

BRIEF DESCRIPTION OF THE DRAWINGS

The objects, features and advantages of the present invention will now be illustrated in more detail by the following detailed description, reference being made to the accompanying drawings in which.

DETAILED DESCRIPTION OF THE PREFERRED EMBODIMENT

Figure 1:
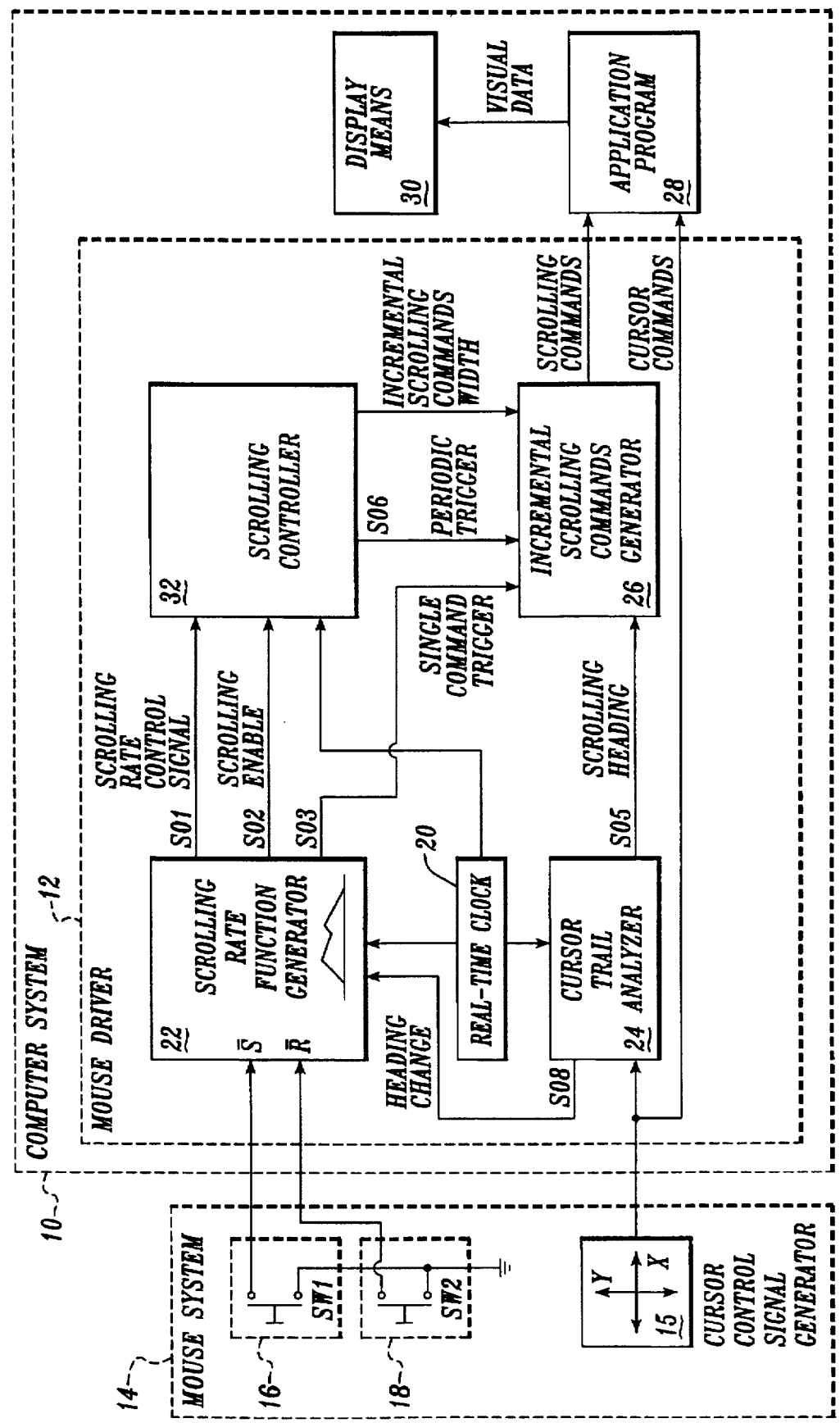
FIG. 1 is a block diagram of a computer system using a mouse driver arrangement according to the invention.
Figure 6:
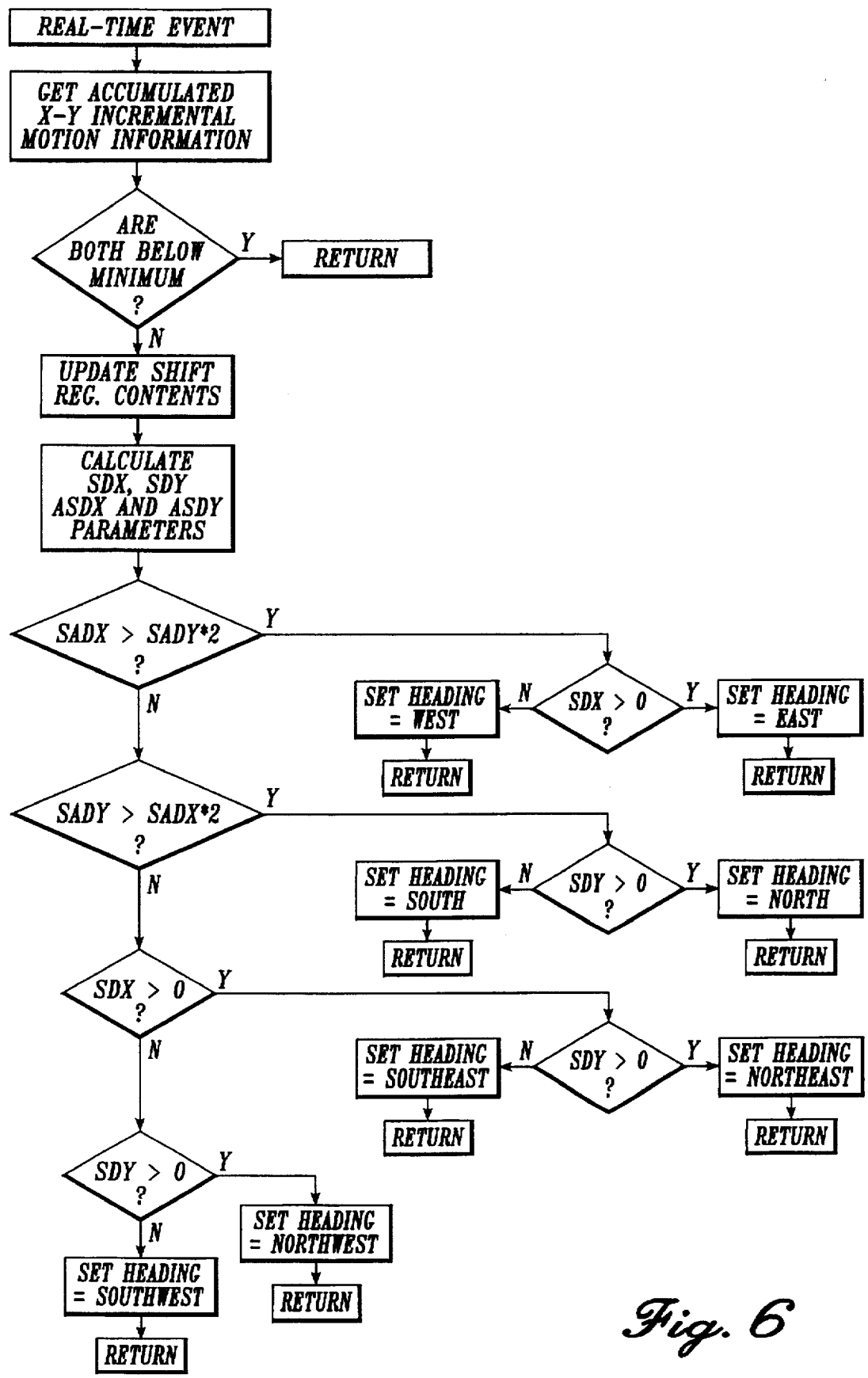
FIG. 6 is a flow diagram representing the process undertaken by the CTA of a mouse driver arrangement according to the invention, to set the scrolling vector direction from a cursor trail's x-y data.

FIG. 1 is a block diagram of a computer system 10 using a mouse driver arrangement 12 according to the present invention. The block diagram of FIG. 1 is based on the analogous diagram of the referenced patent (FIG. 6 of the referenced patent). FIG. 1 also shows a conventional mouse represented by block 14, including an x-y transducer 15 and two push-buttons 16 and 18 assigned for scrolling control (i.e., the scroll button and the stop button respectively).

The mouse driver 12 translates the signals generated by a conventional mouse into scrolling commands and cursor movement commands as well. As shown in FIG. 1, the mouse driver 12 consists of five functional blocks: a real-time clock means 20, which is a real-time reference for the other four functional blocks, which are: an SRFG circuit means 22, which controls the scrolling-vector magnitude (i.e., the scrolling-rate); a CTA circuit means 24, which analyzes the cursor x-y motion and detects mouse movements to set the scrolling-vector direction (similar to the analogous means disclosed in the referenced patent); an incremental scrolling commands generator circuit means 26, which includes software routines for determining the particular incremental scrolling command to be issued to an application program 28, according to the scrolling vector direction set by the CTA 24, for producing the corresponding visual effect on a display means 30; plus, a scrolling timing generator circuit means 32, which generates a strobe signal for triggering incremental scrolling commands generated by circuit means 26, at a rate according to the scrolling-vector magnitude.

Figure 5:
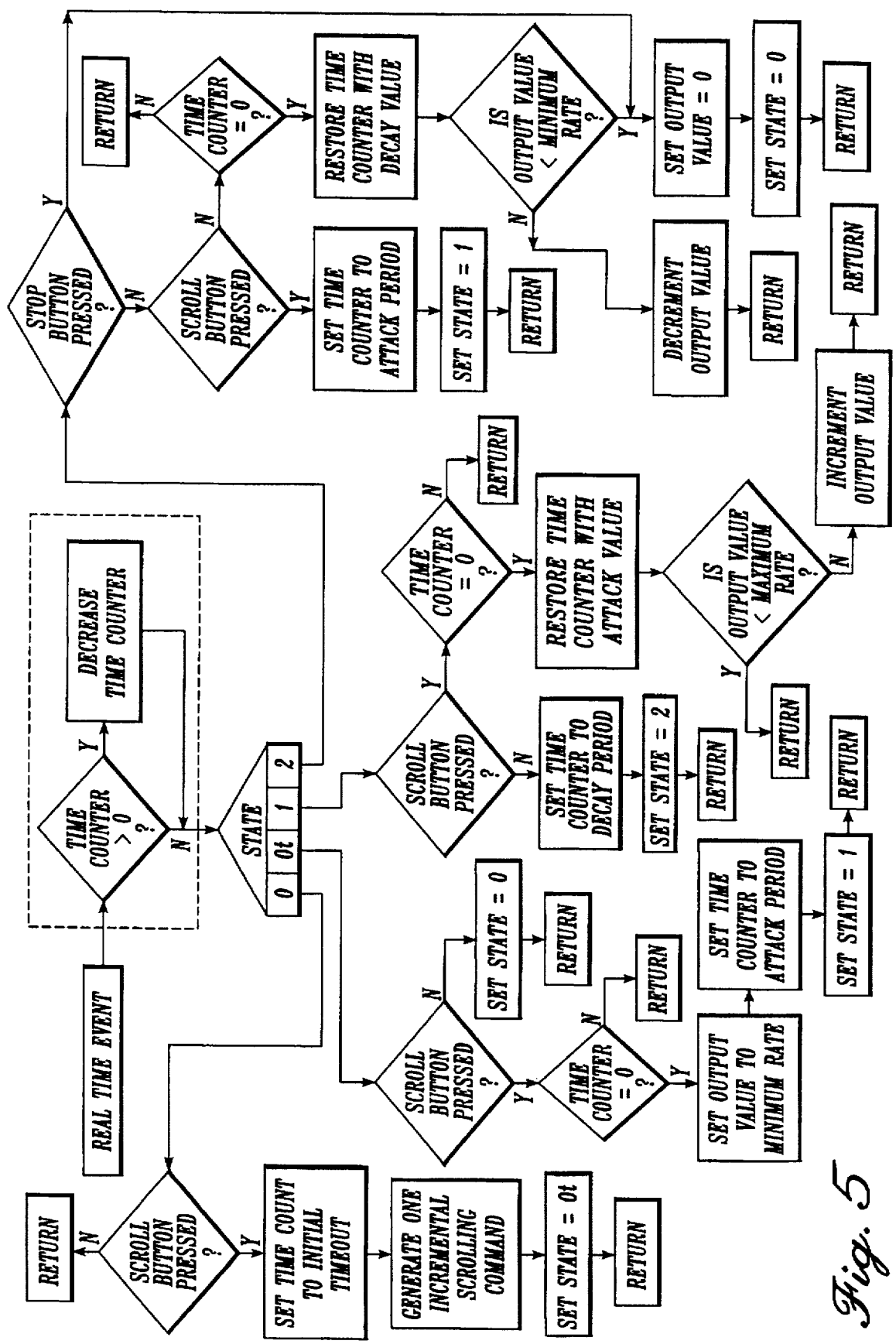
FIG. 5 is a flow diagram representing an enhanced digital embodiment of the SRFG of a mouse driver arrangement according to the invention.

The signals generated by the mouse buttons 16 and 18 are transmitted to the computer and processed by the SRFG means 22, which comprises software routines for integrating two alternate signal sources according to the scroll-button signal status, and generating ramp-like scrolling-rate control signal segments. The SRFG means 22 generates three outputs: a first output SO1, representative of the scrolling vector magnitude; a second output SO2, which is a flag signal indicating that an SRFG cycle is active (used for enabling the generation of incremental scrolling commands); plus, a third output SO3, which is a one-step trigger signal generated immediately after the scroll button is pressed and is used to generate a single incremental scrolling command, before an initial time-out expires and an SRFG cycle begins (as explained later on herein, in relation to the flow diagram of FIG. 5).

The output SO1 is fed to the scrolling controller means 32, which produces an output SO6 comprising a periodic signal used as a strobe for generating the incremental scrolling commands at a controlled rate, while an SRFG cycle is active. Output SO6 is fed to the incremental scrolling commands generator circuit means 26. The incremental scrolling commands generated by circuit means 26 are transferred to an application program 28 through a suitable software path, and by similar means as the cursor control commands.

At the same time, the conventional signals generated by transducer 15 are bypassed to the application program, for controlling the cursor movement as it is usually done. A copy of these signals is input to the CTA circuit means 24, which contains software algorithms for detecting a dominant direction in the cursor trail. The CTA circuit means 24 generates two outputs: a first output SO5, representing the value of the scrolling heading status variable, which represents the scrolling vector direction (e.g., North, South, North-West, etc.); and, a second output SO8 that indicates when a scrolling-heading change takes place. Both variables are kept by the CTA and are dynamically updated at each real-time event generated by real-time clock means 20, so that they reflect the information captured in the immediate past history of the cursor movement. When different headings are set in two successive real-time events (i.e., a change in the scrolling vector's direction), the SRFG's integrator is discharged to start a new SRFG cycle in the new direction. This allows to browse a given data space in different directions without releasing the scroll button.

The scrolling incremental command generator 26 includes software routines that generate the corresponding incremental commands upon reception of the scrolling strobes generated by either the scrolling timing generator circuit means 32 (for SRFG-driven scrolling), or the SRFG 22 (for single-step scrolling). The particular command generated by incremental scrolling commands generator 26 depends on the value of the scrolling heading status variable maintained by circuit means 24. The output generated by incremental scrolling commands generator 26 is linked to the available incremental scrolling routines of the application program, to generate the corresponding visual effect on the display means 30. It will be apparent to those skilled in the art that this can be done through a variety of hardware/ software techniques known in the art (e.g., emulation of signals generated by scroll-bars).

It will be also apparent to those skilled in the art, that all functions performed by the various elements present in the mouse driver arrangement of FIG. 1 can be realized through a number of alternative embodiments, comprising hardware means and/or software routines widely known in the art.

In particular, alternative embodiments of the SRFG output are disclosed herein below.

Figure 2:
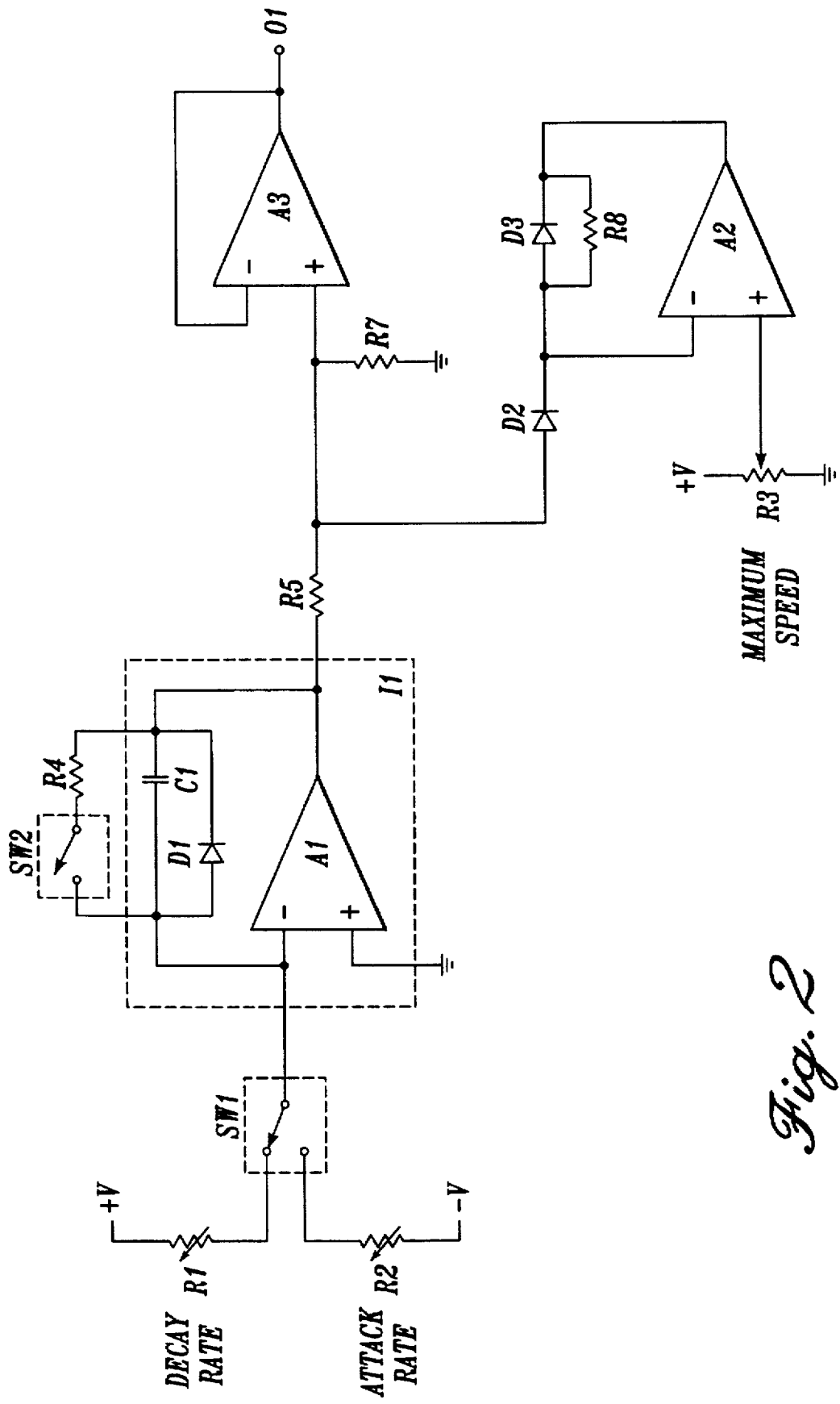
FIG. 2 is a schematic diagram of an analog embodiment of an SRFG of a mouse driver arrangement according to the invention.

FIG. 2 shows an analog circuit embodiment of an SRFG. The analog embodiment is first disclosed to provide a better explanation of the SRFG concept. A digital embodiment is explained later on herein.

In the circuit of FIG. 2, operational amplifier A1 and capacitor C1 conform an integrator I1, which is an essential part of the SRFG. The negative lead of operational amplifier A1 is the input of integrator I1, which through switch SW1 can be connected to alternate current sources. Switch SW1 represents the mouse's scroll button 16, and is shown in its released position in FIG. 2 (i.e., not scrolling). In that position, the input of integrator I1 is connected to a positive current source configured by voltage source +V through resistor R1, which produces a negative-going ramp on the integrator's output (i.e., decay segment). Since the SRFG's output controls the scrolling vector magnitude, it must be limited to positive values. For that purpose, negative voltages are inhibited by action of diode D1, which closes the negative feedback loop of operational amplifier A1 when the output voltage crosses 0V, by-passing the current fed by R1. The slope of the decay segment is determined by R1 and C1. When switch SW1 is activated, an alternative negative current source configured by voltage source -V through resistor R2 is connected to the input of integrator I1, producing a positive-going ramp in the integrators output (i.e., attack segment). The slope of the positive-going ramp is determined by R2 and C1. The positive-going ramp continues until a pre-defined output voltage threshold is reached, controlled by operational amplifier A2 and associated circuitry (i.e., sustain segment). When the integrator's output voltage crosses the voltage threshold provided by the middle point of R3, diode D2 starts conducting and operational amplifier A2 drains all excess current from the integrator's output through the series R5-D2-D3, so as to clamp the output voltage at that pre-defined threshold. Resistor R8 maintains the closed loop of operational amplifier A2 while diodes D2 and D3 are not conducting. The position of the middle point of R3 determines the sustain level of the SRFG output.

Switch SW2 represents the stop button 18. When switch SW2 is activated, capacitor C1 discharges through resistor R4, which has a comparatively low value, taking the integrator's output value abruptly to zero.

Resistors R5 and R7 configure a voltage divider. The voltage level at R7 is input to amplifier A3 that acts as an output stage. The SRFG output is available at lead O1, and can be convened to a digital format through appropriate analog-to-digital converter means.

Figure 3:
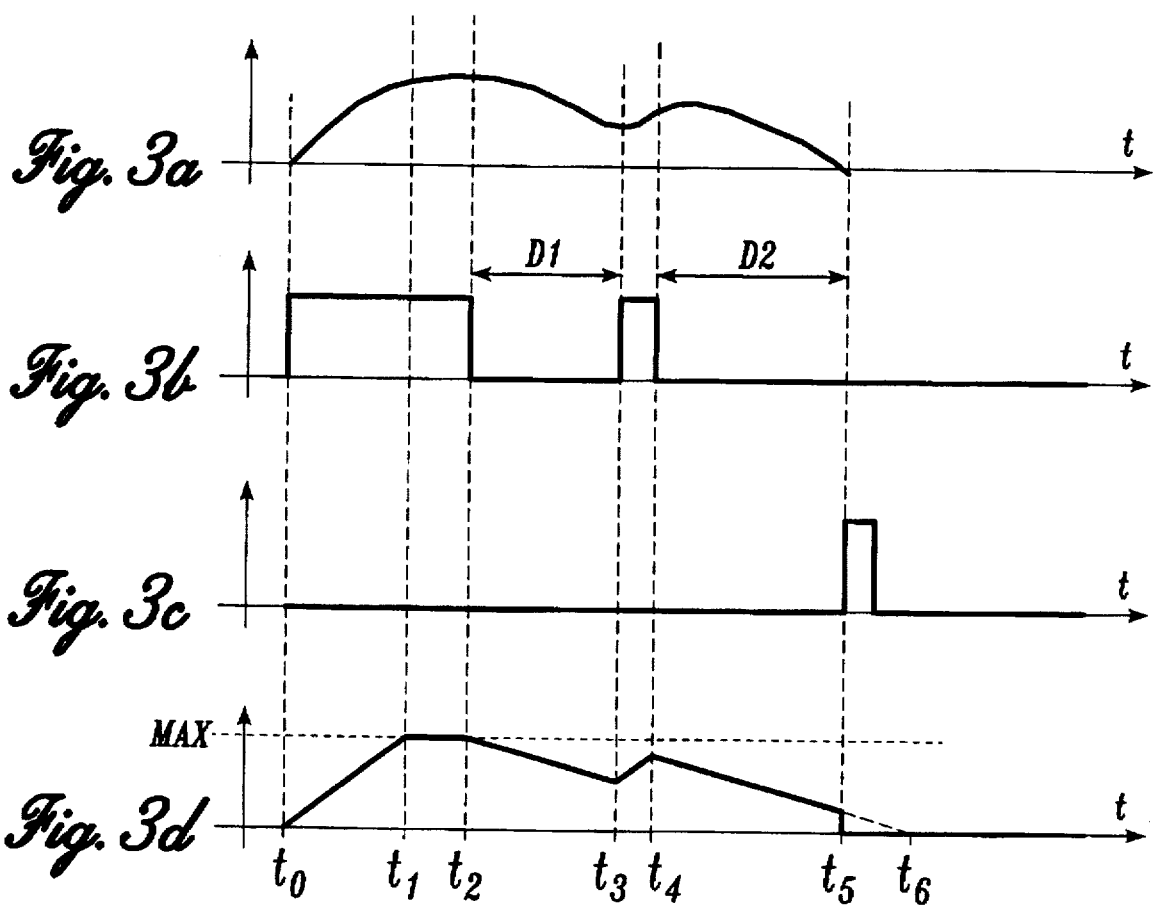
FIGS. 3a, 3b, 3c and 3d are time charts of scrolling control signals showing a typical scrolling-rate control signal's profile, and the way it is achieved through the SRFG feature of the mouse driver of the present invention, through operation of a conventional mouse's push-buttons.

FIG. 3 explains how the output of the SRFG of FIG. 2 governs scrolling operations. FIG. 3a shows a typical scrolling-rate control-signal profile as the one generated when the scrolling mouse disclosed in the referenced patent is operated. At time t0, the operator starts a scrolling operation to change the display's scrolling position. At that moment, the operator starts scrolling at increasing rates until at approximately time t1, the scrolling rate reaches a maximum value. This value is determined by a number of factors, among which are the computer's processor speed, the display system capabilities, the program's scrolling response, the operator's preference, etc. At approximately time t2, the operator perceives the scrolling image is reaching the desired scrolling position, and so starts decreasing the scrolling-rate, so as to analyze more closely the scrolling image. At time t3, the operator resolves that the desired scrolling position is still some distance away from the current point, and so increases the scrolling-rate again, until approximately time t4. At that point, the operator decides to start decreasing the scrolling-rate again, so as to browse the scrolling image at a lower rate until time t5, in which the desired scrolling position is finally reached and so the scrolling-rate is taken abruptly to zero, and the displayed image becomes still.

The disclosed process is something that happens very frequently when operating a computer with a mouse as the one disclosed in the referenced patent. All scrolling operations have a very similar profile, in which the scrolling-rate starts at zero, has a plurality of rising and falling segments, and finally decreases to zero again, until another scrolling operation is started.

One important fact is that as higher is the scrolling speed, lower is the precision needed in controlling the scrolling-rate. This is because of the natural limitation of the human eye to look precisely at moving objects, for what the operator can follow the dynamic image just in a very coarse way. Therefore, precision is not a critical requirement when scrolling at high rates. However, it is indeed a requirement when related to the scrolling rate variation law, since the more precise the scrolling rate follows a pre-defined variation law, the more predictable the system becomes, and more precision can be achieved in the final scrolling position.

The way in which this scrolling behavior can be obtained through the SRFG feature of the mouse driver of this invention is shown in FIGS. 3b, 3c, and 3d. FIGS. 3b and 3c represent the control action that the operator must perform with the scroll button and the stop button respectively, to control the SRFG's output. FIG. 3d represents the SRFG's output signal (i.e., the scrolling-vector magnitude).

At time t0, the operator must press the scroll button to start a scrolling operation, increasing the scrolling rate according to the SRFG's output signal, as shown in FIG. 3d. At time t1, the SRFG's output reaches its upper limit, which can be adjusted to fit the operator's particular needs. At time t2, the operator releases the scroll button and the scrolling-rate descends controlled by the SRFG's output. At time t3, the operator decides to increase the scrolling rate again (a new impulse given to the image) and so presses again the scroll button. The scrolling-rate starts increasing again from the value it had immediately before. At time t4, the operator foresees the final scrolling position on the display, and so releases the scroll button to start decreasing the scrolling-rate (the screen image looses impulse). At that point, the scrolling-rate would descend to zero and the display image would stop at time t6, but if the operator needs to stop immediately, for example because he or she has just seen the target object on the screen, the stop button can be pressed to discharge the SRFG's integrator abruptly at time t5. The stop button is an added feature but is not essential. It will be apparent to those skilled in the art, that the stop button can be also any keyboard key, or even any other mouse button that is not used while the scrolling-rate is in its decay segment (e.g., any mouse button other than the scroll button may be assigned for the stop function, exclusively while the decay segment is active).

An important advantage of SRFG-driven scrolling is that the overall time and attention the operator must give to scrolling operations are reduced. This is because during the decay segments represented as periods D1 and D2 in FIG. 3b, the mouse is free to start another pointing operation while the image is still scrolling. For example, if the operator is searching for a given paragraph in a word-processing file to alter some of its attributes, when the target paragraph is about to come up on the displayed image, the operator can release the scroll button and start driving the cursor to the application's menu area to activate the desired function. Once an operator masters the SRFG-driven response, he or she knows when to release the scroll button to achieve a given scrolling position. This situation is significantly frequent while operating a computer system with a mouse, and so the overall result is a more dynamic mouse operation and more user comfort.

Figure 4:
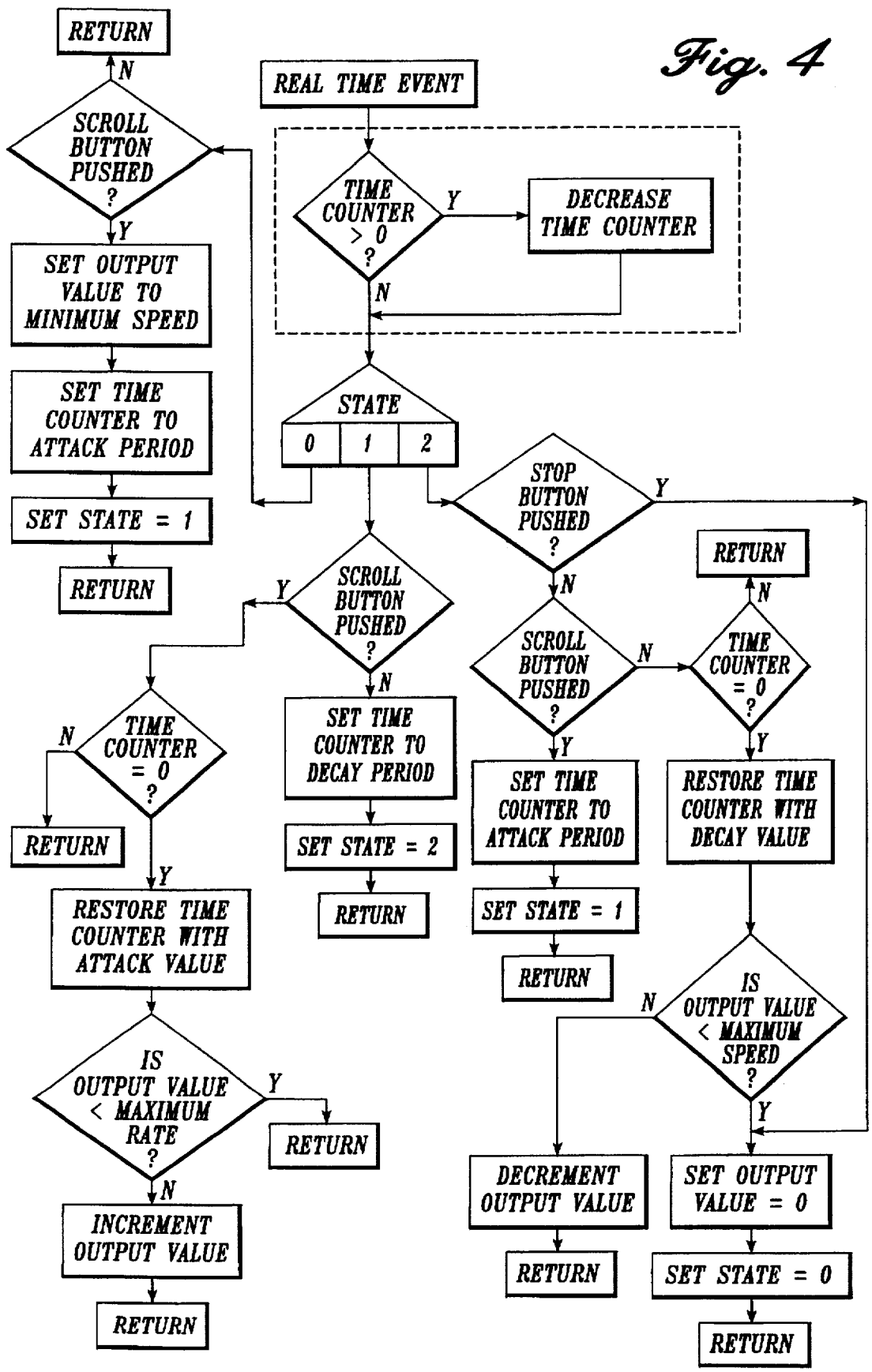
FIG. 4 is a flow diagram representing a basic digital embodiment of the SRFG of a mouse driver arrangement according to the invention.

FIG. 4 shows a simplified flow diagram of a digital implementation of the SRFG, which performs the same functions as the analog circuit of FIG. 2.

The flow represented in FIG. 4 is a state machine, in which state 0 is an idle state (i.e., no button is pressed and the scrolling rate is zero), state 1 is the attack cycle and sustain cycle (i.e., the scroll button is pressed and the scrolling-rate is either increasing or steady), and state 2 is the decay cycle (i.e., the scroll button is released and the scrolling-rate is decreasing).

In the flow of FIG. 4, a master time counter is implemented, which is used and maintained by all states, and is reset each time it reaches zero (represented by the flow delimited by a dotted line in FIG. 4). Each SRFG segment (i.e., each state) controls its own timing by loading the time counter with a different count, which can be adjusted to alter the attack and decay slopes. Within the attack segment, the sustain segment is implemented by limiting the maximum value of the SRFG output. This value can also be adjusted, so that it becomes the sustain segment level.

At the idle state, if the scroll button is pressed, a scrolling operation is started and the SRFG output (the scrolling rate) is set to a minimum pre-set value. The time count is set to a value corresponding to the attack segment slope, and the state variable is set to 1, so that on the next real-time clock, the flow corresponding to state 1 is run.

While in state 1 (attack segment), and as long as the scroll button is pressed, the output value of the SRFG is increased evenly in each real time event in which the time counter crosses zero, to produce the integrator effect. This happens until the maximum value is reached, in which the sustain segment starts or until the scroll button is released, in which case the decay segment starts.

While in state 2 (decay cycle), the output value of the SRFG is decreased until a pre-set minimum value is reached. At that point, the SRFG output value goes to zero (stops scrolling) and the mouse driver goes back to state 0, to start the following SRFG cycle upon a change in the scroll button status. If during the decay segment, the scroll button is pressed again, the SRFG jumps again to state 1 to start a new attack segment from the current scrolling rate value, and so on. If the stop button is pressed instead, the decay cycle finishes instantly and the mouse driver goes back to state 0.

The basic structure of the flow shown in FIG. 4 can be enhanced in several ways. For example, an additional state can be added so that if the stop button is pressed during the attack cycle, instead of stopping the scrolling motion, the mouse driver jumps to a special state in which the scrolling rate slows down to a lower value, until the stop button is released back, in which case the mouse driver returns to state 1. This is useful for example for decreasing the scrolling rate instantly to a low value for inspecting a certain part of a file, without discharging the integrator, and then restoring the original scrolling rate to keep on scrolling at maximum speed. At the same time, if the scroll button is released before the stop button while the system is in the special state, the scrolling rate should go instantly to 0, to be consistent with the SRFG behavior outlined above.

An initial time-out period prior to the SRFG cycle can be added to the flow of FIG. 4, so as to allow issuing just one incremental scrolling command by pressing and releasing the scroll button in a short time. This is done by inserting an intermediate time-out state 0t between state 0 and state 1, as shown in the flow diagram of FIG. 5. In this case, when the scroll button is pressed at the idle state, the initial time-out is started and at the same time a single incremental scrolling command is issued to the application program, but the SRFG output cycle is not started. At the intermediate state 0t, once the initial time-out elapses, the mouse driver jumps to state 1 to start the normal SRFG cycle.

As explained herein before, if the scrolling-rate is directly proportional to the integrator's output, the inertial effect makes the SRFG-driven response more natural and predictable. However, a non-linear transfer function can also be used (e.g., an exponential function) to obtain an even wider scrolling rate range, although the predictability of the SRFG response may not be the same, since the inertial effect is lost.

Still another enhancement for widening up the scrolling rate range consists in using the button velocity information to control the sustain segment level. Once again, the techniques used in electronic music synthesizers are useful for scrolling operations. In music synthesizers, a note's strength is taken from the speed with which the note's key changes its status from an inactive position to an active one. The note's strength is obtained by measuring the time elapsed from the moment in which the note's key departs from its inactive position to the moment it arrives to its active position. The note's strength is then used to alter the note's volume (i.e., the note's sustain level), and other note's dynamic parameters as well.

In this way, applying this technique to a mouse driver for scrolling control, the final scrolling-rate (i.e., the sustain segment level) can be altered according to the scroll button's velocity. If a slow motion is issued to the scroll button when it is activated, a low final rate is obtained, while in a fast motion is done to activate it (i.e., a more emphatic finger movement is done), a higher final scrolling-rate is obtained. This gives an additional degree of freedom to control the sustain segment's level, using just a binary switch. The only requirement for implementing this feature is that the scroll-button's sensing-means of the mouse must be able to indicate an intermediate position while the button is changing from its inactive position to its active position (for example an open circuit), so as to allow the time measurement between both states, and the button hardware should not have a snap-like operation that would distort the time measurement. The velocity value obtained can be used for altering not only the sustain level's scrolling rate, but also the attack and decay slopes (i.e., the corresponding time counts) to provide a consistent SRFG response.

The SRFG feature of the mouse driver of the present invention is disclosed herein above. Following is the disclosure of the remaining functional blocks.

The algorithms contained in CTA circuit means 24 of the mouse driver for setting the scrolling heading are derived from those disclosed in the referenced patent, and are also based on calculation of four parameters from the contents of a shift register in which a plurality of successive cursor positions are stored.

In the method disclosed in the referenced patent, a scrolling axis status variable is updated at each real time event, according to the dominant axis (between x and y) present in a shift-register that stores the cursor-movement data. Therefore, the scrolling axis status variable has two possible states; horizontal or vertical. The final heading within that axis is determined by the sign of a scrolling control signal generated by hardware means.

In the CTA implementation of the present invention, the scrolling vector heading, is set by the dominant direction of the cursor trajectory amid a plurality of heading alternatives. Since the SRFG's output-signal is always positive, the final heading is exclusively determined by the mouse movement data.

In the preferred embodiment, the heading alternatives comprise four orthogonal alternatives which are: North, South, East and West, plus four additional sloped alternatives which are: North-East, North-West, South-East and South-West.

Following is the list of the four parameters used in the present embodiment and their definition:

sdx: sum of the shift register contents along the "x" axis;
sdy: sum of the shift register contents along the "y" axis;
sadx: sum of the absolute values of the shift register contents along the "x" axis;
sady: sum of the absolute values of the shift register contents along the "y" axis.

The flow diagram for determining the scrolling vector heading from these parameters is shown in FIG. 6. As shown in FIG. 6, if any of both parameters sadx and sady is greater than the other one multiplied by two, one of the orthogonal heading alternatives is set, according to the sign of the corresponding parameter sdx or sdy. Otherwise, the corresponding sloped heading alternative is set, according to the signs of both parameters sdx and sdy. This criterion for determining the dominant heading defines eight possible cursor-trail zones which are represented in FIG. 7b. As shown in FIG. 7b, the criterion used for determining the scrolling-vector heading defines zone boundaries comprising four lines placed at ±30° and ±60°, respectively. This results in a higher "priority" to all four orthogonal directions over the sloped ones, since their associated zones are twice-wide compared to the ones associated to the sloped directions. This is desirable since the orthogonal directions are the most frequently used ones.

Figure 7A:
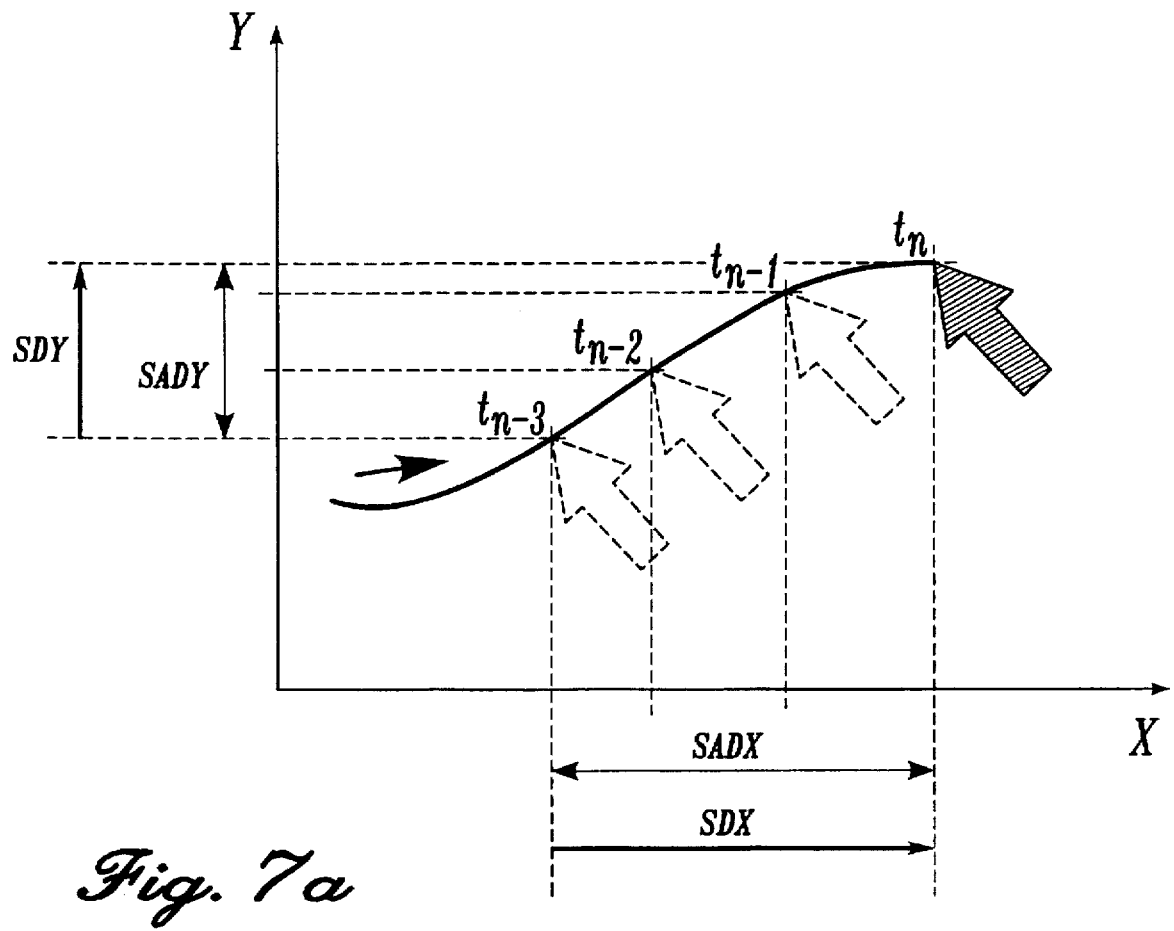
FIG. 7a is an x-y diagram showing an example of a cursor trajectory and its consecutive cursor positions, in which are also represented parameters calculated by the CTA of a mouse driver arrangement according to the present invention.
Figure 7B:
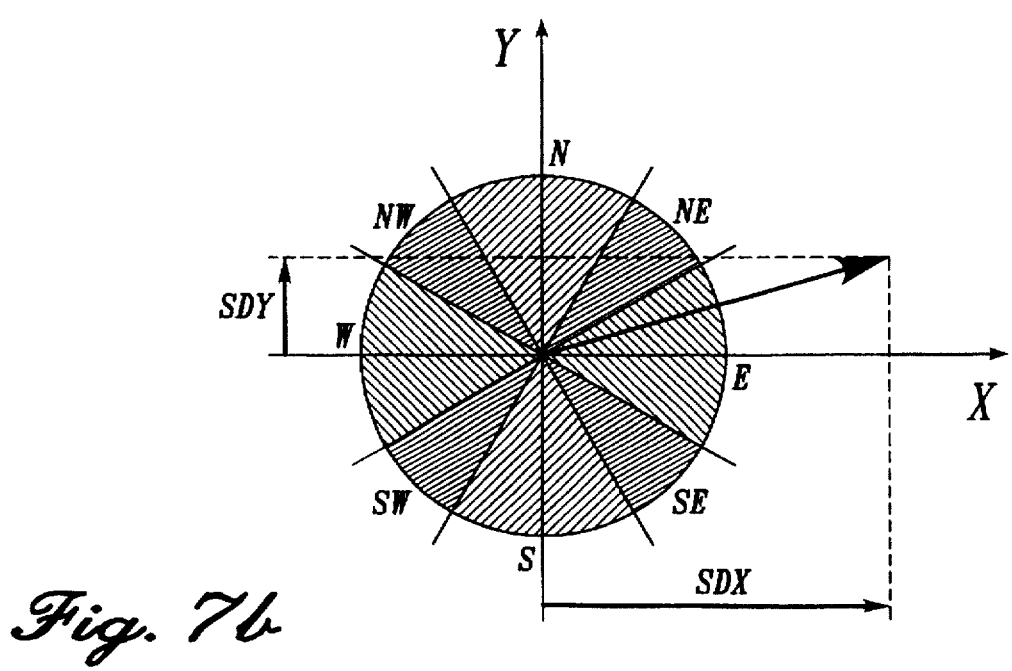
FIG. 7b is a schematic diagram representing the scrolling-vector heading alternatives considered in the preferred embodiment of a mouse driver arrangement according to the invention.

The method for determining the scrolling vector heading is summarized in FIG. 7. In FIG. 7a, a possible cursor trajectory is shown, with its axis components and the corresponding shift-register parameters. In FIG 7b, the scrolling vector heading is determined according to the zone in which the cursor-trail data falls (which is East in the case shown in FIG. 7b).

Any number of scrolling heading alternatives can be implemented. However, this particular embodiment is relatively simple to implement, since the sloped heading alternatives are placed at 45° in each quadrant (i.e., they have a 1:1 ratio among their orthogonal components), and so the projection of the scrolling-vector over both axes is straight forward. In other words, when a sloped heading alternative is active (e.g., North-East), the visual effect is obtained simply by generating two consecutive incremental scrolling commands along both axes, for each strobe signal generated by scrolling controller circuit means 32 of FIG. 1. In a fast-enough computer like the ones available today, the consecutive scrolling commands are perceived as simultaneous, resulting in a sloped scrolling effect. The input-output function of incremental scrolling commands generator means 26 of FIG. 1 is summarized in Table I:

TABLE I

| INPUT<br>Scrolling Vector Heading | OUTPUT<br>Incremental Scrolling Command |
|---|---|
| North | Line-Up |
| South | Line-Down |
| East | Line-Right |
| West | Line-Left |
| North-East | Line-Up + Line-Right |
| South-East | Line-Down + Line-Right |
| North-West | Line-Up + Line-Left |
| South-West | Line-Down + Line-Left |

In an alternative embodiment, other sloped directions can be added to allow more precision in setting the scrolling heading. In that case, the projection of the scrolling-vector over both axes can be implemented by altering the width of the corresponding incremental commands. This can be done by implementing a table containing the width ratio among both axes for each scrolling-vector heading alterative considered. In any case, a heading-monitor window can be generated on the computer display means to allow the operator to constantly monitor the current scrolling-vector heading (as shown in FIG. 8).

The operation of the mouse driver of the present invention is summarized in FIG. 8, in which the computer display means 30 is represented by rectangle 50 displaying two logical windows 52 and 54 respectively. A cursor 60 and a scrolling-vector monitor window 56 are also shown in FIG. 8. Window 56 contains an arrow 58 that represents the scrolling vector and whose direction is updated at each real-time event reflecting the status of the scrolling heading status variable.

Figure 8A:
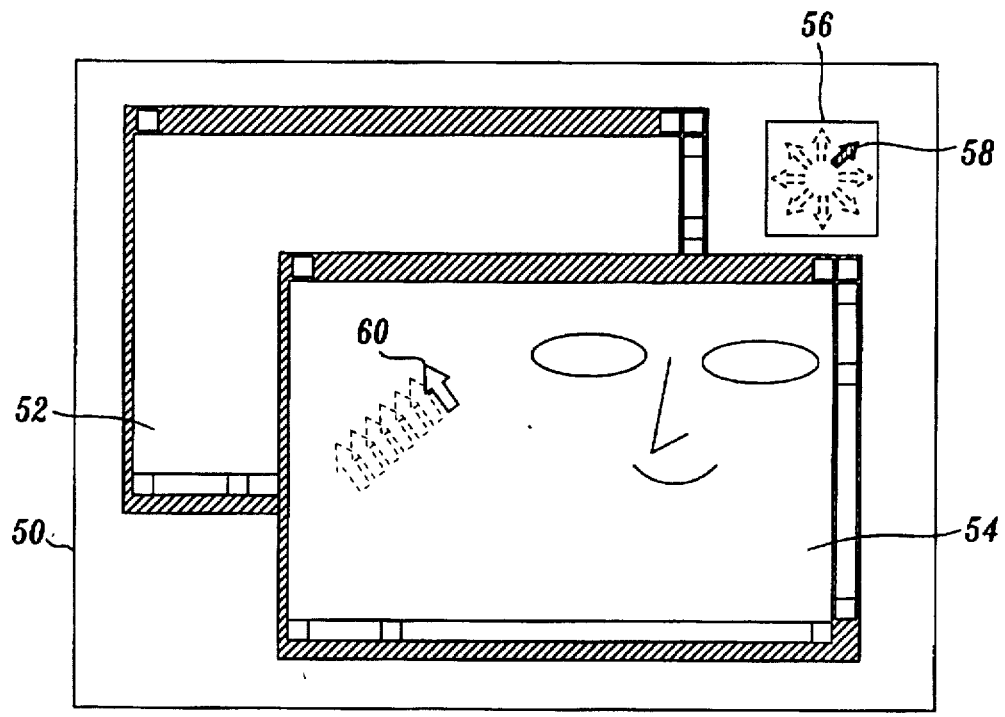
FIG. 8a and 8b illustrate a method of using the mouse driver according to the invention, and are representations of a computer's display means including logic windows generated by respective application programs, plus a scrolling-vector monitor window, generated by the mouse driver of the invention.
Figure 8B:
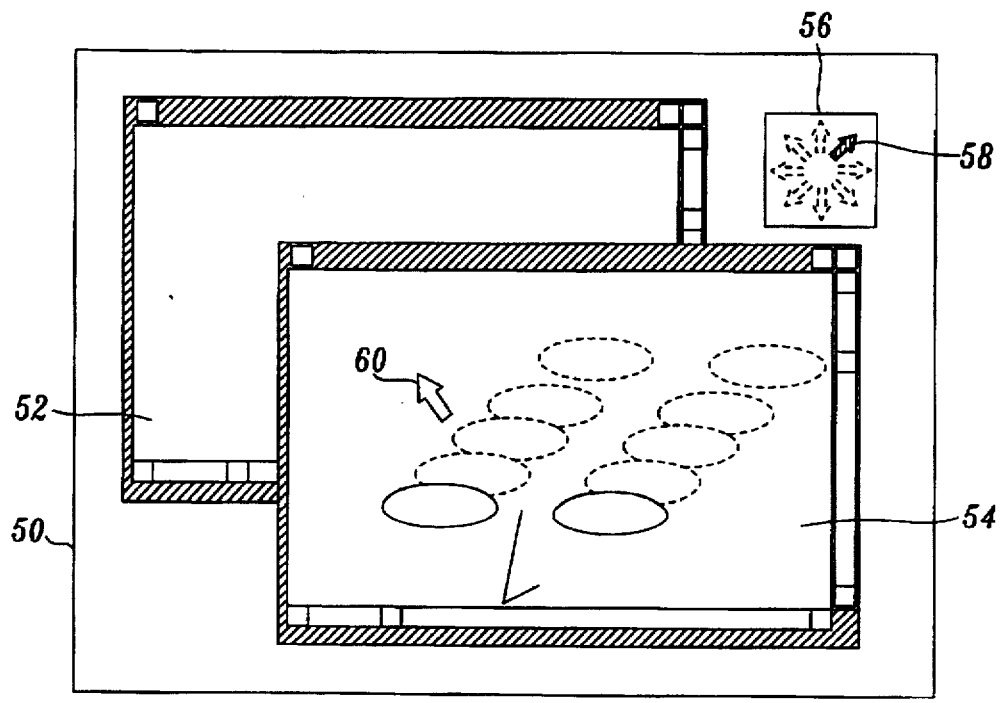

FIG. 8a, represents the status of the computer system at a given time T1 while FIG. 8b, represents the same status at a later time T2. At time T1, a sloped cursor motion is done and the scrolling-vector heading is set to 45° in the first quadrant. The arrow 58 in the scrolling-vector monitor is set by the mouse driver as shown in FIG. 8a, to inform the operator about the current scrolling-vector's status. Immediately afterwards at time T2, the operator presses the scroll button and starts an SRFG cycle. At that point, the mouse driver generates incremental scrolling commands according to the scrolling vector heading and sends them to the application program that owns window 54. The contents of window 54 are scrolled at a rate controlled by the SRFG, as shown in FIG. 8b. The scrolling operation continues until the scroll button is released, after what the scrolling rate is decreased under control of the SRFG.

In this way, the mouse driver arrangement of the present invention allows it to perform scrolling in any direction, from an arbitrary cursor position and providing a wide-range scrolling-rate control, but using a conventional mouse for this purpose.

While the invention has been illustrated and embodied in a mouse driver arrangement for providing scrolling capabilities to a conventional mouse, it is not intended to be limited to the details shown, since various modifications and structural changes may be made without departing in any way from the spirit of the present invention. For example, the arrangement of the invention could be implemented directly in an application program or in an operating system to provide the same features, since the processing needed for its implementation can be done not only at a mouse driver level, but at an application level as well.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. A mouse driver arrangement for improving interactive operation of a computer by an operator using a mouse, the computer including display means for displaying visual information to the operator, processing means for generating and managing the visual information, memory means for storing temporary data and at least one program running in the computer, and real-time clock means for providing synchronizing signals to the programs, the mouse including means for generating x-y incremental movement information for driving a cursor to any of a plurality of cursor positions on the display means for pointing to information entities displayed thereon, binary control means having a plurality of possible combined states for generating binary control information, and communication means for transmitting the movement information and the binary control information to the computer, said mouse driver arrangement comprising:

first processing means for capturing said x-y incremental movement information and said binary control information to generate cursor control signals for positioning said cursor on said display;

second processing means for storing said x-y incremental movement information as incremental coordinates of successive cursor positions measured at each of said synchronizing signals;

third processing means for analyzing said coordinates to detect a dominant direction amid a plurality of alternative direction options in movement of said cursor and setting a scrolling-direction status variable accordingly;

fourth processing means comprising a function generator for producing a time-varying output signal for scrolling-rate control, said output signal being dependent on said states of said binary control means according to a group of corresponding predefined variation laws; and fifth processing means for generating incremental scrolling commands for scrolling said visual information at a rate according to the magnitude of said scrolling-rate control signal and in a direction according to said scrolling-direction status variable so that said entities can be moved over said display means at a plurality of velocities and in a plurality of directions under control of said operator by manipulation of said binary control means.

2. The mouse driver arrangement of claim 1, wherein said states include an active state and a released state and said group of pre-defined variation laws include at least a rising segment and a falling segment so that a range of scrolling rates can be attained by switching said binary control means between said active state and said released state.

3. The mouse driver arrangement of claim 2, wherein said output signal has a default value and said fourth processing means includes means for limiting the value of said output signal to a predefined maximum so that said output signal can vary only within said default value and said maximum.

4. The mouse driver arrangement of claim 3, wherein said segments include:

an attack segment wherein said output signal rises in time as long as said binary control means are held at said active state and said output value is less than said predefined maximum;

a sustain segment wherein said output signal is clamped at said predefined maximum until said binary control means are switched back to said released state; and a decay segment wherein said output signal decreases in time until said output signal reaches said default value.

5. The mouse driver arrangement of claim 4, wherein said fourth processing means further includes means for re-setting said function generator according to a third state of said binary control means so that said output signal can be driven abruptly to said default value at any desired moment.

6. The mouse driver arrangement of claim 5, wherein said attack segment and said decay segment are substantially linear so that said information entities have a scrolling behavior similar to a physical object under the action of a force.

7. The mouse driver arrangement of claim 6, wherein said direction status variable can be set to a plurality of scrolling direction alternatives, and wherein said fifth processing means generates incremental scrolling commands of variable widths along the x and y axis of said visual display, being said widths of said incremental scrolling commands determined by projecting said scrolling direction options over said x and y axis.

8. The mouse driver arrangement of claim 7, wherein said scrolling direction options include a North direction option, a South direction option, an East direction option, a West direction option, a North-East direction option, a North-West direction option, a South-East direction option, and a South-West direction option.

9. The mouse driver arrangement of claim 8, wherein said visual display means displays a scrolling direction monitor-window indicating which of said direction options is active at each of said synchronizing signals for improving orientation of said operator while operating said mouse.

10. The mouse driver arrangement of claim 9, wherein said fourth processing means further includes means for measuring a switching time between said released state and said active state of said binary control means and the slopes of said attack segment and said decay segment are dynamically modified according to switching time so that a plurality of scrolling accelerations are obtained by manipulation of said binary control means.

11. A method of operating a computer in an interactive manner, the computer including a display means for displaying information entities to an operator and a mouse connected to the computer, the mouse comprising means for generating x-y movement information for positioning a cursor for pointing to the information entities, binary control means for generating binary control information for the computer, and communication means for transmitting the movement information and the binary control information to the computer, the computer further including programmable circuit means for generating the information entities displayed in the display means, said method generating incremental scrolling commands from the binary control commands for moving the information entities on the display means by operation of the binary control means in a plurality of directions and at a plurality of velocities by the operator, said method comprising the steps of:

(a) analyzing a trail of said cursor at periodic time intervals;

(b) determining a dominant direction present in said cursor trail amid a plurality of direction options at each of said periodic time intervals;

(c) dynamically setting a scrolling-direction status variable according to said dominant direction determined in step (b);

(d) sensing a state of said binary control means at each of said periodic little intervals;

(e) generating a scrolling-rate control signal according to a time-variation law, said time-variation law being selected from a group of predefined time-variation laws according to said state of said binary control information sensed in step (d); and (f) scrolling said information entities in a scrolling direction according to said scrolling direction status variable determined in step (c) and at a rate according to said scrolling-rate control signal determined in step (e).

12. The method of claim 11, wherein said states include an active state and a released state, and said group of predefined variation laws include at least a rising segment and a falling segment so that a range of scrolling states can be attained by switching said binary control means between said active state and said released state.

13. The method of claim 12, wherein said scrolling-rate control signal has a default value further including the step of limiting the value of said scrolling-rate control signal to a predefined maximum so that said scrolling-rate control signal can vary only within said default value and said maximum.

14. The method of claim 12, wherein said segments include:

an attack segment wherein said scrolling-rate control signal rises in time as long as said binary control means are held at said active state and said output value is less than said predefined maximum;

a sustain segment wherein said scrolling-rate control signal is clamped at said predefined maximum until said binary control means are switched back to said released state; and a decay segment wherein said scrolling-rate control signal decreases in time until said scrolling-rate control signal reaches said default value.

15. The method of claim 13, further including the step of resetting said scrolling-rate control signal if a third state of said binary control means is sensed so that said scrolling-rate control signal can be driven abruptly to said default value instantaneously at any desired moment.

16. The method of claim 15, wherein said attack segment and said decay segment are substantially linear so that said information entities have a scrolling behavior similar to a physical object under the action of a force.

17. The method of claim 16, wherein said direction options include a North direction option, a South direction option, an East direction option, a West direction option, a North-East direction option, a North-West direction option, a South-East direction option, and a South-West direction option.

18. The method of claim 17, including the step of displaying a scrolling direction monitor-window on said display means for indicating which of said direction options is active at each of said periodic time intervals for improving orientation of said operator while operating said mouse.

19. The method of claim 18, including the step of measuring a switching time between said released state and said active state of said binary control means and dynamically modifying the slopes of said attack segment and said decay segment according to said switching time so that a plurality of scrolling accelerations are obtained by manipulation of said binary control means.

* * * * *

UNITED STATES PATENT AND TRADEMARK OFFICE
CERTIFICATE OF CORRECTION

PATENT NO.    : 5,633,657
DATED         : May 27, 1997
INVENTOR(S)   : F.D. Falcón It is certified that error appears in the above-indentified patent and that said Letters Patent is hereby corrected as shown below:

| COLUMN | LINE | |
|---|---|---|
| 15<br>(Claim 11, | 53<br>line 27) | "little" should read --time-- |
| 14<br>to<br>15<br>(Claim 7, | 67<br>to<br>1<br>lines 2–3) | Delete "direction status variable can be set to a plurality of scrolling direction alternatives, and wherein said" |

Signed and Sealed this

Ninth Day of September, 1997

Attest:

BRUCE LEHMAN

Attesting Officer          Commissioner of Patents and Trademarks